US009762493B2

(12) United States Patent
Chowdhury et al.

(10) Patent No.: US 9,762,493 B2
(45) Date of Patent: *Sep. 12, 2017

(54) LINK AGGREGATION (LAG) INFORMATION EXCHANGE PROTOCOL

(71) Applicant: International Business Machines Corporation, Armonk, NY (US)

(72) Inventors: Sisir Chowdhury, Fremont, CA (US); David Iles, San Jose, CA (US); Keshav G. Kamble, Fremont, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 220 days.

This patent is subject to a terminal disclaimer.

(21) Appl. No.: 14/644,137

(22) Filed: Mar. 10, 2015

(65) Prior Publication Data

US 2015/0188824 A1     Jul. 2, 2015

Related U.S. Application Data

(63) Continuation of application No. 13/741,338, filed on Jan. 14, 2013, now Pat. No. 9,014,219.

(51) Int. Cl.
*H04L 12/891* (2013.01)
*H04L 12/803* (2013.01)
(Continued)

(52) U.S. Cl.
CPC .......... *H04L 47/125* (2013.01); *H04L 45/245* (2013.01); *H04L 47/41* (2013.01);
(Continued)

(58) Field of Classification Search
CPC ..... H04L 45/245; H04L 47/41; H04L 47/827; H04L 69/24
See application file for complete search history.

(56) References Cited

U.S. PATENT DOCUMENTS 6,385,201 B1    5/2002  Iwata
7,433,326 B2 * 10/2008  Desai .................... H04L 69/24
                                                     370/255
(Continued)

FOREIGN PATENT DOCUMENTS

CN      102123104 A      7/2011

OTHER PUBLICATIONS

IEEE, "IEEE Standard for Local and metropolitan area networks—Link Aggregation," IEEE Computer Society, Nov. 3, 2008, 163 pages.

(Continued)

*Primary Examiner* — Hoon J Chung
(74) *Attorney, Agent, or Firm* — Zilka-Kotab, P.C.

(57) ABSTRACT

In one embodiment, a switch includes a processor and logic integrated with and/or executable by the processor to receive details about which link aggregation (LAG) information about a first peer switch will be exchanged with the switch, send to the first peer switch, prior to receiving the LAG information about the first peer switch, details about which LAG information about the switch will be exchanged with the first peer switch, receive the LAG information about the first peer switch, store the LAG information about the first peer switch, and use the LAG information about the first peer switch and the LAG information about the switch to determine load balancing across one or more connections between the switch and the first peer switch.

20 Claims, 7 Drawing Sheets

(51) Int. Cl.
*H04L 12/709* (2013.01)
*H04L 29/06* (2006.01)
*H04L 29/08* (2006.01)
*H04L 12/911* (2013.01)

(52) U.S. Cl.
CPC .......... *H04L 67/1044* (2013.01); *H04L 69/24* (2013.01); *H04L 47/827* (2013.01); *Y02B 60/33* (2013.01)

(56) References Cited

U.S. PATENT DOCUMENTS

| | | | |
|---|---|---|---|
| 7,502,374 | B1 | 3/2009 | Parker et al. |
| 7,639,605 | B2 | 12/2009 | Narayanan et al. |
| 7,778,201 | B2 | 8/2010 | Daines et al. |
| 7,940,645 | B2 | 5/2011 | Kim et al. |
| 8,054,830 | B2 | 11/2011 | Jain et al. |
| 9,014,219 | B2 | 4/2015 | Chowdhury et al. |
| 2005/0276263 | A1 | 12/2005 | Suetsugu et al. |
| 2008/0298236 | A1* | 12/2008 | Ervin ............... H04L 47/10 370/232 |
| 2011/0205909 | A1 | 8/2011 | Cao et al. |
| 2011/0310729 | A1 | 12/2011 | Raman et al. |
| 2012/0033678 | A1 | 2/2012 | Page et al. |
| 2012/0039335 | A1 | 2/2012 | Subramanian et al. |
| 2014/0025736 | A1* | 1/2014 | Wang ............... H04L 45/46 709/204 |
| 2014/0198647 | A1 | 7/2014 | Chowdhury et al. |

OTHER PUBLICATIONS

Viswanathan et al., "TraceFlow," Internet Draft, Internet Engineering Task Force (IETF), Feb. 18, 2008, pp. 1-38.
Non-Final Office Action from U.S. Appl. No. 13/741,338, dated Aug. 15, 2014.
Notice of Allowance from U.S. Appl. No. 13/741,338, dated Nov. 28, 2014.
Chowdhury et al., U.S. Appl. No. 13/741,338, filed Jan. 14, 2013.

* cited by examiner

500

LAG Index : 1
Hashing algorithm : 1
LAG type : static
Max number of LAGs: 16
Number of LAGs used : 4
Max number of port members : 32
Number of port members : 8
Custom Field 0 : X
...
Custom Field 9 : X LAG Index : 2
Hashing algorithm : 3
LAG type : dynamic
Max number of LAGs: 8
Number of LAGs used : 8
Max number of port members : 64
Number of port members : 12
Custom Field 0 : X
...
Custom Field 9 : X

•
•
•

LAG Index : N
Hashing algorithm : 2
LAG type : dynamic
Max number of LAGs: 12
Number of LAGs used : 8
Max number of port members : 32
Number of port members : 4
Custom Field 0 : X
...
Custom Field 9 : X

FIG. 5

LINK AGGREGATION (LAG) INFORMATION EXCHANGE PROTOCOL

BACKGROUND

The present invention relates to data center infrastructure, and more particularly, this invention relates to exchanging link aggregation information between neighboring switches.

Network packet switches use Link Aggregation (LAG) to create a higher bandwidth port channel using multiple switch ports. LAG may be formed statically or dynamically. Static LAG has a fixed number of ports which are always members of the LAG if they are configured to be members of the LAG. Dynamic LAG, according to Link Aggregation and Control Protocol/LACP IEEE802.3AD, provides facilities where port members may dynamically join and leave the dynamic LAG. Distributing or load balancing network traffic over the LAG ports is accomplished with algorithms, various different algorithms being currently available to control distribution across members in a LAG. Good algorithms provide efficient ways of hashing packets over the member ports, make sure each port is used equally, and ensure that no one port gets congested.

A switching processor, such as a switching application specific integrated circuit (ASIC), may be used to provide various algorithms which choose ports for network packets. Most of the algorithms are based upon tuples formed from information in the packet header of the packets. The tuples typically include a source media access control (MAC) address, a destination MAC address, a virtual local area network (VLAN) identifier, a source internet protocol (IP) address, a destination IP address, a source transport port, and a destination transport port. Some algorithms consider additional programmable factors to achieve better distribution of packets on ports and/or other usage metrics.

LAGs are important properties of the switches in a network and impact the performance of the switches and network in general. LAGs also alter the overall performance of the set of switches connected together as a CLOS of switches or otherwise connected. LAG algorithms have significant impact on the overall congestion in the CLOS of switches. However, individual CLOS member switches have no knowledge of LAG properties of other member switches in the CLOS or the hashing algorithm(s) used.

Accordingly, it would be beneficial to more efficiently operate a CLOS of switches or otherwise connected switches having one or more LAGs defined therein by sharing LAG properties between immediate switch neighbors.

SUMMARY

In one embodiment, a switch includes a processor and logic integrated with and/or executable by the processor to receive details about which link aggregation (LAG) information about a first peer switch will be exchanged with the switch, send to the first peer switch, prior to receiving the LAG information about the first peer switch, details about which LAG information about the switch will be exchanged with the first peer switch, receive the LAG information about the first peer switch, store the LAG information about the first peer switch, and use the LAG information about the first peer switch and the LAG information about the switch to determine load balancing across one or more connections between the switch and the first peer switch.

In another embodiment, a computer program product includes a computer readable storage medium having computer readable program code embodied therewith, the embodied computer readable program code including computer readable program code to receive details, at a switch, about which LAG information about a first peer switch will be exchanged with the switch, computer readable program code to send to the first peer switch, prior to receiving the LAG information about the first peer switch, details about which LAG information about the switch will be exchanged with the first peer switch, computer readable program code to receive, at the switch, the LAG information about the first peer switch, computer readable program code to store, on the switch, the LAG information about the first peer switch, and computer readable program code to use the LAG information about the first peer switch and the LAG information about the switch to determine load balancing across one or more connections between the switch and the first peer switch.

In yet another embodiment, a method includes receiving details about which LAG information about a first peer switch will be exchanged with the switch, sending to the first peer switch, prior to receiving the LAG information about the first peer switch, details about which LAG information about the switch will be exchanged with the first peer switch, receiving the LAG information about the first peer switch, storing the LAG information about the first peer switch, and using the LAG information about the first peer switch and the LAG information about the switch to determine, using a hardware processor, load balancing across one or more connections between the switch and the first peer switch.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 5 shows LAG detail structures, according to another embodiment.

DETAILED DESCRIPTION

Figure 1:
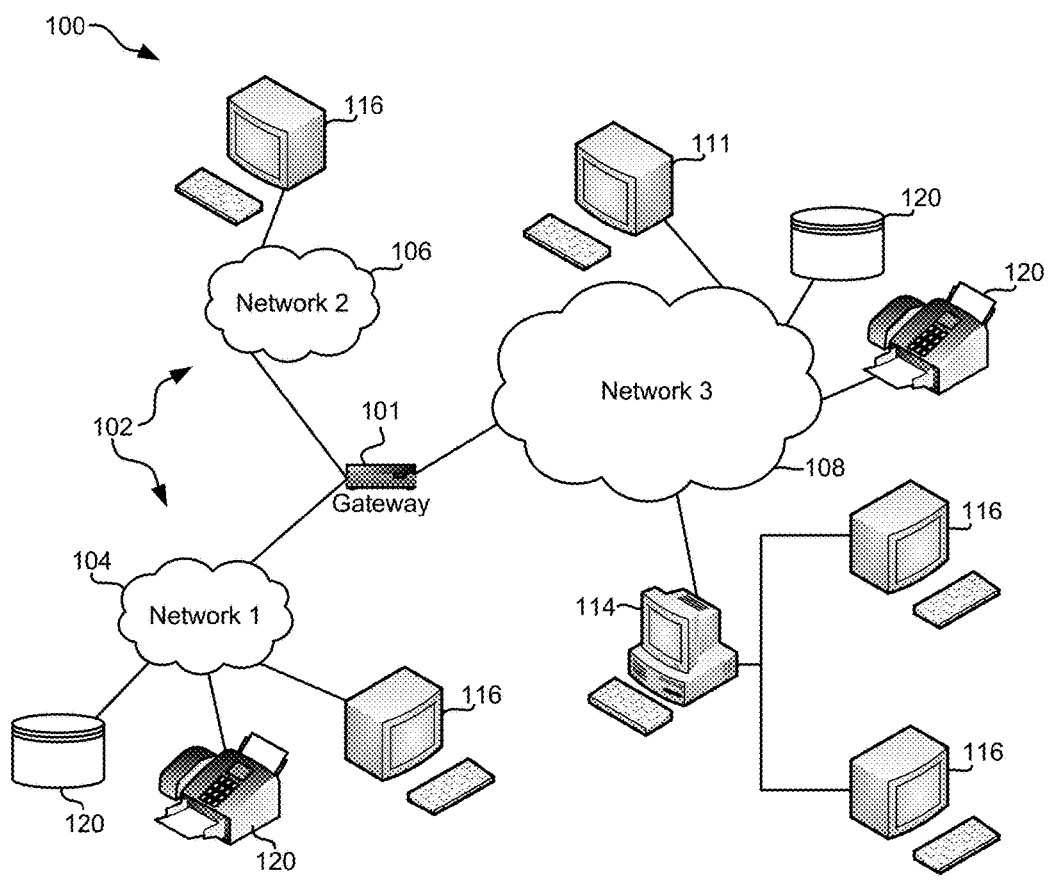
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a switch includes a processor adapted for executing logic, logic adapted for receiving link aggregation (LAG) information about a first peer switch, logic adapted for storing the LAG information about the first peer switch, and logic adapted for using the LAG information about the first peer switch and LAG information about the switch to determine load balancing across one or more connections between the switch and the first peer switch.

In another general embodiment, a computer program product for exchanging LAG information between peer switches includes a computer readable storage medium having computer readable program code embodied therewith, the computer readable program code including computer readable program code configured for receiving LAG information about a first peer switch at a second peer switch, computer readable program code configured for storing the LAG information about the first peer switch, and computer readable program code configured for using the LAG information about the first peer switch and LAG information about the second peer switch to determine load balancing across one or more connections between the first and second peer switches.

In another general embodiment, a method for exchanging LAG information between peer switches includes receiving LAG information about a first peer switch at a second peer switch, storing the LAG information about the first peer switch, and using the LAG information about the first peer switch and LAG information about the second peer switch to determine load balancing across one or more connections between the first and second peer switches, wherein the LAG information about the first peer switch is formatted in a LAG information exchange protocol (LIEP) exchange type-length-value (TLV) protocol data unit (PDU).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
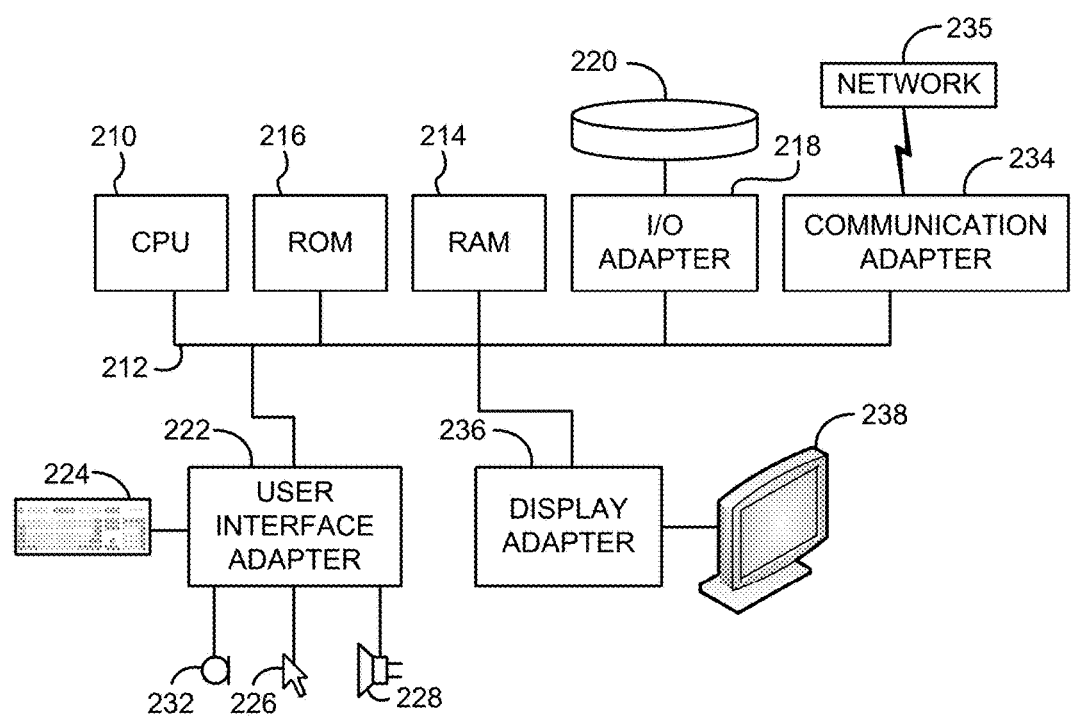
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
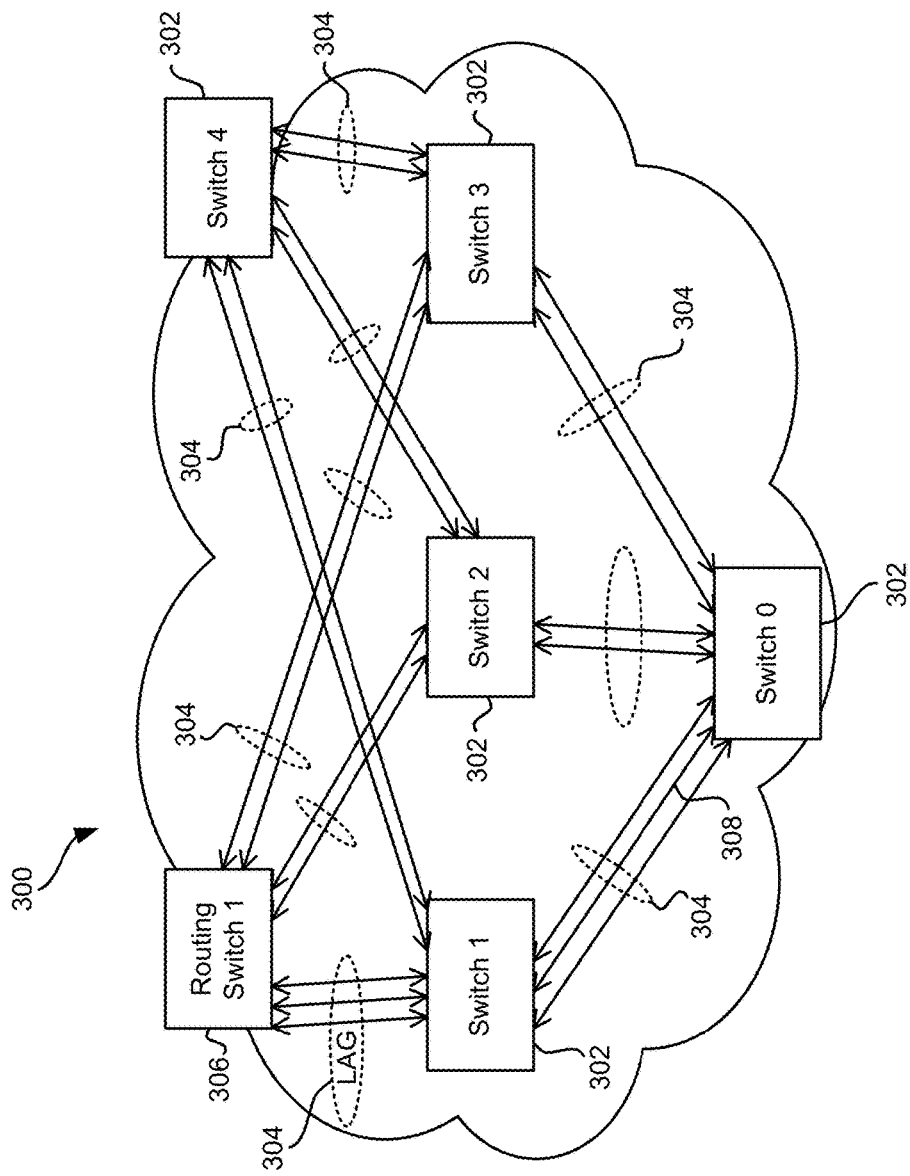
FIG. 3 is a simplified diagram of a system which has a plurality of switches connected together via connections using multiple link aggregation (LAG) groups of ports, according to one embodiment.

Now referring to FIG. 3, hashing is typically used to distribute flows across multiple egress ports in a LAG group comprising two or more member egress ports. FIG. 3 shows a system 300 which has a plurality of switches 302 connected together via connections 308 using multiple LAG groups 304 of ports. There is also a routing switch 306 which may be capable of additional routing functionality, but may still be connected to other switches 302 via ports which are in LAG groups 304. In this context, any two switches 302, 306 connected together via a LAG group 304 of ports may be referred to as peer switches.

The basic operation of LAG hashing is to use flow related data, such as source media access control (MAC) address (SMAC), destination MAC address (DMAC), source IP address (SIP), destination IP address (DIP), transport source address (L4SRC), and transport destination address (L4DST), in order to compute a hash key. The hash key is then used to compute a modulo of that key to distribute flows to the egress ports in the LAG according to their index. One such hashing algorithm is shown below, according to one embodiment:

LAG-member=Hash (SMAC,DMAC,SIP,DIP,L4SRC,L4DST)/num-links;

Hash algorithms are mathematical expressions. The quality of the distribution across the member ports in a LAG group depends on the quality of the hash algorithm and the number of flows, along with correlation to the hashing algorithm used. Other hashing algorithms may be used, as known in the art.

For exchange purposes, each hashing algorithm has been uniquely numbered. Thus, every switch that receives the exchange protocol may interpret the hashing algorithm in the same way. Various hashing algorithms known in the art may be used. Some exemplary hashing algorithms that may be applied include, but are not limited to: equal-cost multipath (ECMP)-based, Header Tuple-Based, Net Flow Tuple-Based, Header Tuple-Based with extra programmable parameters, etc.

A maximum number of ports in a LAG group may vary. Some exemplary numbers of maximum ports in a LAG group may be 2, 6, 10, 16, 32, 64, etc., and may be related to the particular switching processor which is used in the switch.

The switching processor may support a minimum of 32 LAG groups, 64 LAG groups, 128 LAG groups, 256 LAG groups, etc. In addition, as previously described, LAG groups may be static or dynamic in nature.

According to embodiments described herein, LAG Information Exchange Protocol (LIEP) exchange mechanism allows individual switches, when working with each other, to exchange LAG detail properties, like a hashing algorithm used, a number of LAG members, a number of LAG groups supported and/or used, a LAG type, etc. The information exchange occurs with peer switches only. A peer switch, for the sake of these descriptions, is another switch in a LAG group, i.e., a switch to which a plurality of ports are available to send information to the other switch. For such interactions, Link Layer Discovery Protocol (LLDP) may be used, in one embodiment. Some new Type-Length-Values (TLVs) may be used and/or custom fields may be used to store and transfer the information, according to various embodiments.

Figure 4:
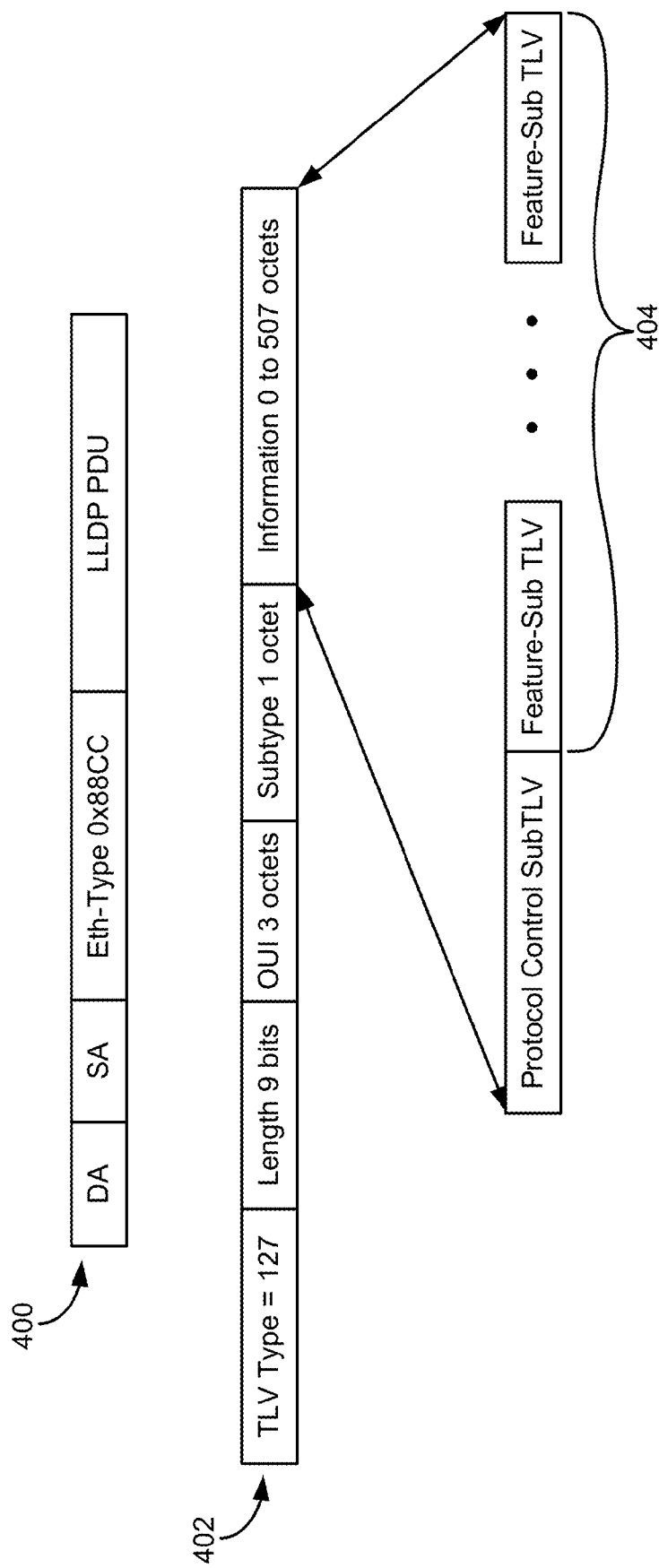
FIG. 4 shows examples of an Ethernet frame format and an organizationally specific Switch Data Exchange Protocol (SDEP) type-length-value (TLV) structure, according to one embodiment.

In one embodiment, a LLDP packet format may be as shown in FIG. 4. Furthermore, as shown, each LAG property may be represented with one feature subtype TLV in a LLDP protocol data unit (PDU). In FIG. 4, one embodiment of the Ethernet Frame Format 400 is shown where a destination address (DA) field, a source address (SA) field, an Ether-type field (Eth-Type 0x88CC), and a LLDP PDU field are shown in relative (but not accurate) sizes. In addition, an organizationally specific Switch Data Exchange Protocol (SDEP) TLV structure 402 is shown according to one embodiment. In this SDEP TLV 402, the TLV type may be 127, the length field may be 9 bits in size, the Organizationally Unique Identifier (OUI) field may be 3 octets in size, the Subtype field may be 1 octet in size, and the information field may be anywhere from 0 to 507 octets in size, and may comprise a Protocol Control SubTLV field, and a plurality of Feature SubTLV fields 404. It is these Feature SubTLV fields 404 which provide space for specific LAG information to be stored and exchanged between peer switches.

According to various embodiments, more or less information may be included in each Ethernet Frame Format 400, organizationally specific SDEP TLV structure 402, and Feature SubTLV fields 404 as would be understood by one of skill in the art upon reading the present descriptions. In addition, different frame formats may be used to implement LIEP as would be recognized by one of skill in the art upon reading the present descriptions.

FIG. 5 shows LAG detail structures 500, according to one embodiment. The fields shown are representative of the information which may be exchanged between peer switches, and more or less information may be used in various embodiments of the LIEP, as would be recognized by one of skill in the art upon reading the present descriptions.

As shown in FIG. 5, there are present fields for LAG index identifiers (which are unique numbers or alphanumeric codes for each LAG), hashing algorithm used, LAG type, maximum number of LAG groups allowed, number of LAG groups used, maximum number of allowable port members, number of port members used, and custom fields which may include any information desired to be exchanged between peer switches. The custom fields may be numbered 0 through 9, but may number more than 10 fields, according to various additional embodiments. One, some, or all of these custom fields may be used by one or more peer switches without other peer switches needing to have information stored therein.

Figure 6:
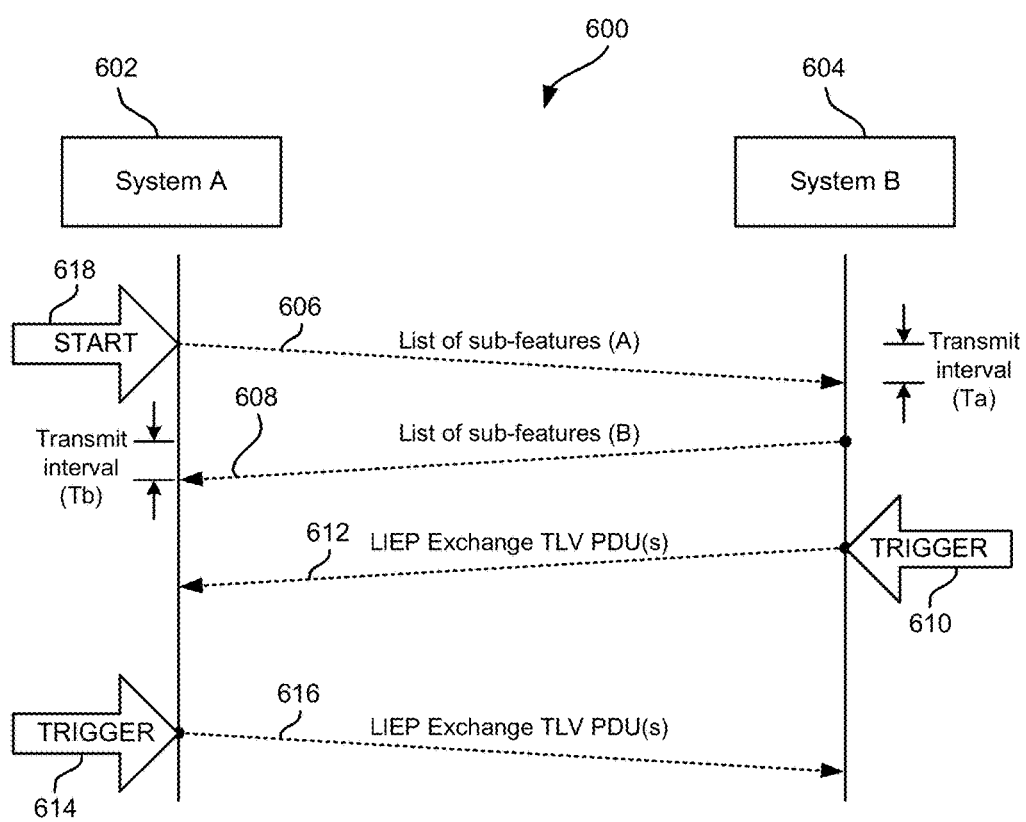
FIG. 6 shows a control state machine which may be used for LIEP, according to one embodiment.

In FIG. 6, LIEP is shown as being implemented using a control state machine 600. This control state machine 600 may handle trigger criteria to start the information exchange between the peer switches.

As shown in FIG. 6, System A 602 may be exchanging LAG information with System B 604. The exchange of information may be started (as denoted by START 618) for any of the triggering reasons described herein according to various embodiments. In this embodiment, the START 618 indicates boot-up of the systems. After the start, a list of sub-features 606 describing the LAG properties of System A 602 may be sent from System A 602 to System B 604. This transfer of information may take a transmit interval of Ta, and may be sent in one or more Feature SubTLV fields. Then, after receiving the list of sub-features 606 from System A 602, System B 604 may return a list of sub-features 608 describing the LAG properties of System B 604 to System A 602 which may take a transmit interval of Tb, and may be sent in one or more Feature SubTLV fields. After receipt of the list of sub-features 608 describing the LAG properties of System B 604, both systems should have accurate LAG information about each other, which allows more efficient usage of the LAG ports in each system and across the network.

Then, as indicated by TRIGGER 610, a triggering event may occur regarding System B 604, as described herein according to various embodiments, which may cause System B 604 to send one or more LIEP Exchange TLV PDU(s) 612 to System A 602. These one or more LIEP Exchange TLV PDU(s) 612 may indicate changes to configuration of LAG properties inherent to System B 604. There is no response necessary from System A 602 because there have been no changes to System A 602 which need to be implemented in the information System B 604 has stored.

However, as indicated as TRIGGER 614, a triggering event may occur regarding System A 602, as described herein according to various embodiments, which may cause System A 602 to send one or more LIEP Exchange TLV PDU(s) 616 to System B 604, which may then be reflected in the LAG properties stored in System B 604 about System A 602.

In other embodiments, some other packet type or transmission protocol may be used instead of LLDP, PDUs, or TLVs, as would be understood by one of skill in the art upon reading the present descriptions.

The exchange of information may occur after a fixed interval of time (liep_exchange_time, which is programmable), after an event triggers the exchange (such as a new LAG group member port being added, a LAG group port member being removed, a change to properties of a LAG group, a change to properties of a LAG group member port, etc.), or in response to any other possible exchange triggering condition.

According to various embodiments, each exchange may have a time stamp, the LIEP exchange may occur at boot-up when the peer switch links come online, and to keep the overhead for this process as low as possible, this process may be asynchronous (but synchronous processing is also possible if desired by a network administrator for some reason).

According to various embodiments, there may be no request for the LAG information produced by a peer switch in the system because this would unnecessarily congest the communication network with requests. Instead, the LIEP insists that all information exchanged is done so on a push basis, and not a pull basis.

In more approaches, the LIEP exchange may also be triggered due to a configuration change on the CLOS or cluster member switches. Thus, the trigger may be due to either a configuration change or a liep_exchange_time expiry. The LIEP exchange may occur at the end of the liep_exchange_time exchange interval or after the configuration change is identified, reported, recognized, completed, etc., and the switch on which the configuration change has occurred may then send out the updated LIEP information to other peer switches.

In addition, in various embodiments, the exchange frequency may be programmable individually for each peer switch, or a universal exchange frequency may be dictated for all peer switches. In the latter case, the peer switches may exchange a frequency for updating and all peer switches may indicate acceptance of that exchange frequency. The peer switches may also exchange sub-feature types supported with each other and exchange sub-feature types for which there has been an agreement between the peer switches will be exchanged. However, as indicated previously, some peer switches may exchange more or less information than other peer switches, and the excess information may or may not be used by the receiving peer switch.

Figure 7:
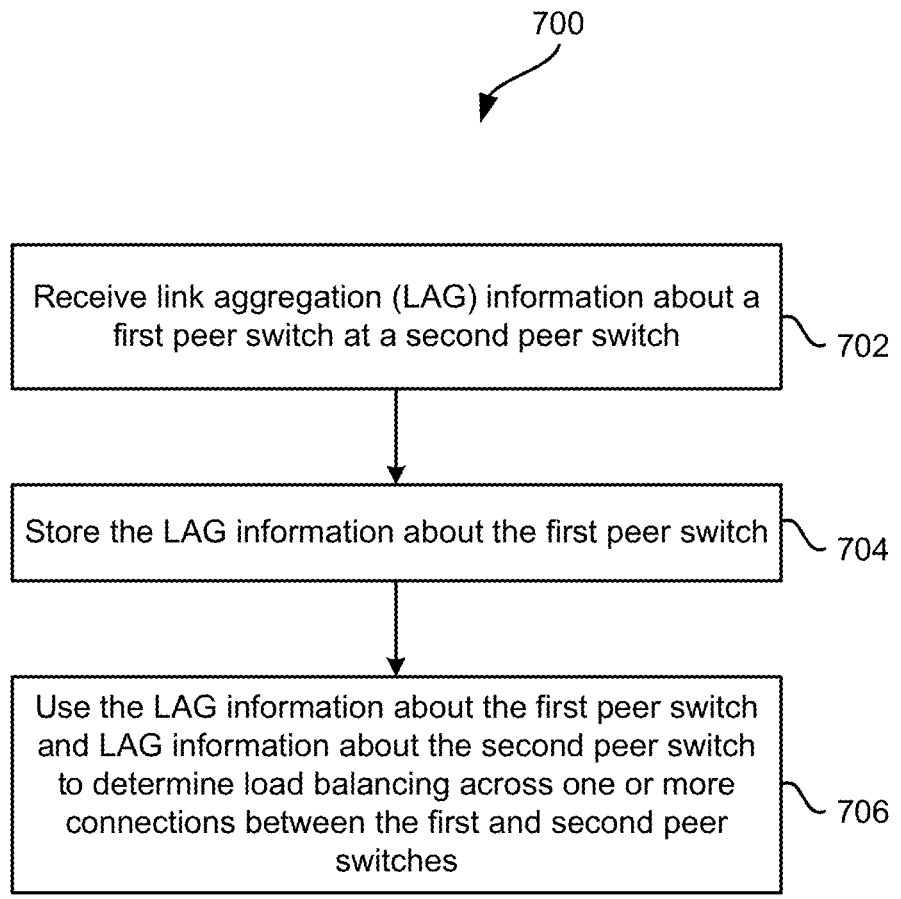
FIG. 7 is a flowchart of a method for exchanging LAG information between peer switches, according to one embodiment.

Now referring to FIG. 7, a flowchart of a method 700 for exchanging LAG information between peer switches, according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in one embodiment, the method 700 may be partially or entirely performed by a processor, such as a switching ASIC or a CPU, of a switch in a LAG group relationship with another peer switch.

As shown in FIG. 7, method 700 may initiate with operation 702, where LAG information about a first peer switch is received at a second peer switch.

In one embodiment, the LAG information about the first peer switch may comprise any or all of: a LAG index for the first peer switch, a hashing algorithm used for the first peer switch, a maximum number of LAG members allowed for the first peer switch, an actual number of LAG members used by the first peer switch, a maximum number of LAG groups supported by the first peer switch, an actual number of LAG groups used by the first peer switch, and a LAG type (static or dynamic) for the first peer switch.

In more approaches, additional information may be included in the LAG information, such as VLAN identifiers associated with the LAG groups, bridge identifiers associated with the LAG groups, to account for configuration (and to be used in a consistency check), etc.

In more approaches, the LAG information about the first peer switch may be formatted in a LIEP exchange TLV PDU, as described in more detail herein according to various embodiments.

In operation 704, the LAG information about the first peer switch is stored, such as to a memory of the second peer switch. Any memory type may be used as known in the art, such as RAM, ROM, Flash, non-volatile memory (NVM), Kernel memory, etc.

In operation 706, the LAG information about the first peer switch and LAG information about the second peer switch are used to determine load balancing across one or more connections between the first and second peer switches In a further embodiment, using the LAG information about the first and second peer switches may comprise changing a LAG hashing algorithm used by the first and second peer switch to alleviate congestion on the one or more connections between the first and second peer switches. Since different hashing algorithms are available to both peer switches, it may be beneficial to switch to a different hashing algorithm in order to alleviate congestion between the peer switches across the shared member ports.

In one approach, the method 700 may further include, prior to receiving the LAG information about the first peer switch: receiving, at the second peer switch, details about which LAG information about the first peer switch will be exchanged with the second peer switch, and sending, to the first peer switch, details about which LAG information about the second peer switch will be exchanged with the first peer switch.

In another embodiment, the method 700 may further include determining that a triggering event has occurred at the second peer switch and sending, in response to the triggering event having occurred, the LAG information about the second peer switch to the first peer switch. The LAG information (updated LAG information) about the second peer switch may be resent to the first peer switch each time a triggering event occurs. In this way, the first peer switch may be updated as to LAG properties of the second peer switch at any given time.

The triggering event may be at least one of: expiry of a predetermined amount of time, changes to LAG properties of the second peer switch, boot-up of the second peer switch, or any other suitable event known in the art.

In another further embodiment, the method 700 may include receiving updated LAG information about the first peer switch after occurrence of a triggering event and storing the updated LAG information about the first peer switch at the second peer switch.

In more embodiments, referring again to FIG. 7, any or all operations of method 700 may be implemented in a system, a switch, a device, or a computer program product.

For example, in one embodiment, a switch may comprise a processor adapted for executing logic, logic adapted for receiving LAG information about a first peer switch, logic adapted for storing the LAG information about the first peer switch, and logic adapted for using the LAG information about the first peer switch and LAG information about the switch to determine load balancing across one or more connections between the switch and the first peer switch.

In another example, a computer program product for exchanging LAG information between peer switches comprises a computer readable storage medium having computer readable program code embodied therewith. The computer readable program code includes computer readable program code configured for receiving LAG information about a first peer switch at a second peer switch, computer readable program code configured for storing the LAG information about the first peer switch, and computer readable program code configured for using the LAG information about the first peer switch and LAG information about the second peer switch to determine load balancing across one or more connections between the first and second peer switches.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A switch, comprising:
a processor;
a memory; and
logic stored to the memory and executable by the processor to:
receive details about which link aggregation (LAG) information about a first peer switch will be exchanged with the switch;
send to the first peer switch, prior to receiving the LAG information about the first peer switch, details about which LAG information about the switch will be exchanged with the first peer switch;
receive the LAG information about the first peer switch, wherein the LAG information about the first peer switch comprises a maximum number of LAG members allowed for the first peer switch;
store the LAG information about the first peer switch; and
use the LAG information about the first peer switch and the LAG information about the switch to determine load balancing across one or more connections between the switch and the first peer switch.

2. The switch as recited in claim 1, wherein the LAG information about the first peer switch further comprises: a LAG index for the first peer switch, a hashing algorithm used for the first peer switch, an actual number of LAG members used by the first peer switch, a maximum number of LAG groups supported by the first peer switch, an actual number of LAG groups used by the first peer switch, and a LAG type for the first peer switch.

3. The switch as recited in claim 1, wherein the details about which LAG information about the first peer switch will be exchanged with the switch are received prior to receiving the LAG information about the first peer switch.

4. The switch as recited in claim 1, further comprising:
logic to determine that a triggering event has occurred at the switch; and
logic to send, in response to the triggering event having occurred, the LAG information about the switch to the first peer switch,
wherein the LAG information about the switch is re-sent to the first peer switch each time a subsequent triggering event occurs.

5. The switch as recited in claim 4, wherein the triggering event comprises one of: expiry of a predetermined amount of time, changes to LAG properties of the switch, and boot-up of the switch.

6. The switch as recited in claim 4, further comprising:
logic to receive updated LAG information about the first peer switch after occurrence of a triggering event; and
logic to store the updated LAG information about the first peer switch.

7. The switch as recited in claim 1, wherein the LAG information about the first peer switch is formatted in a LAG information exchange protocol (LIEP) exchange type-length-value (TLV) protocol data unit (PDU).

8. The switch as recited in claim 1, wherein the logic to use the LAG information about the first peer switch and the LAG information about the switch comprises logic to change a LAG hashing algorithm used by the first peer switch and the switch to alleviate congestion on the one or more connections between the switch and the first peer switch.

9. The switch as recited in claim 1, further comprising logic integrated with and/or executable by the processor to:
receive details about which LAG information about a second peer switch will be exchanged with the switch;
send to the second peer switch, prior to receiving the LAG information about the second peer switch, details about which LAG information about the switch will be exchanged with the second peer switch;
receive the LAG information about the second peer switch;
store the LAG information about the second peer switch; and
use the LAG information about the first peer switch, the LAG information about the second peer switch, and the LAG information about the switch to determine load balancing across one or more connections between the switch and the first peer switch and one or more connections between the switch and the second peer switch.

10. A computer program product comprising a computer readable storage device having computer readable program code embodied therewith, the embodied computer readable program code comprising:
computer readable program code to receive details, at a switch, about which link aggregation (LAG) information about a first peer switch will be exchanged with the switch;
computer readable program code to send to the first peer switch, prior to receiving the LAG information about the first peer switch, details about which LAG information about the switch will be exchanged with the first peer switch;
computer readable program code to receive, at the switch, the LAG information about the first peer switch;
computer readable program code to store, on the switch, the LAG information about the first peer switch; and
computer readable program code to use the LAG information about the first peer switch and the LAG information about the switch to determine load balancing across one or more connections between the switch and the first peer switch.

11. The computer program product as recited in claim 10, wherein the LAG information about the first peer switch comprises: a LAG index for the first peer switch, a hashing algorithm used for the first peer switch, a maximum number of LAG members allowed for the first peer switch, an actual number of LAG members used by the first peer switch, a maximum number of LAG groups supported by the first peer switch, an actual number of LAG groups used by the first peer switch, and a LAG type for the first peer switch.

12. The computer program product as recited in claim 10, wherein the computer readable program code to receive the details about which LAG information about the first peer switch will be exchanged with the switch comprises computer readable program code to receive the details about which LAG information about the first peer switch will be exchanged with the switch prior to receiving the LAG information about the first peer switch.

13. The computer program product as recited in claim 10, wherein the embodied computer readable program code further comprises:
computer readable program code to determine that a triggering event has occurred at the switch; and computer readable program code to send, in response to the triggering event having occurred, the LAG information about the switch to the first peer switch, wherein the LAG information about the switch is re-sent to the first peer switch each time a subsequent triggering event occurs.

14. The computer program product as recited in claim 13, wherein the triggering event comprises one of: expiry of a predetermined amount of time, changes to LAG properties of the switch, and boot-up of the switch.

15. The computer program product as recited in claim 13, wherein the embodied computer readable program code further comprises:
computer readable program code to receive updated LAG information about the first peer switch after occurrence of a triggering event; and
computer readable program code to store the updated LAG information about the first peer switch.

16. The computer program product as recited in claim 10, wherein the LAG information about the first peer switch is formatted in a LAG information exchange protocol (LIEP) exchange type-length-value (TLV) protocol data unit (PDU).

17. The computer program product as recited in claim 10, wherein the computer readable program code to use the LAG information about the first peer switch and the LAG information about the switch comprises computer readable program code to change a LAG hashing algorithm used by the first and the switch to alleviate congestion on the one or more connections between the switch and the first peer switch.

18. The computer program product as recited in claim 10, wherein the embodied computer readable program code further comprises:
computer readable program code to receive details about which LAG information about a second peer switch will be exchanged with the switch;
computer readable program code to send to the second peer switch, prior to receiving the LAG information about the second peer switch, details about which LAG information about the switch will be exchanged with the second peer switch;
computer readable program code to receive, at the switch, the LAG information about the second peer switch;
computer readable program code to store, using the switch, the LAG information about the second peer switch; and
computer readable program code to use the LAG information about the first peer switch, the LAG information about the second peer switch, and the LAG information about the switch to determine load balancing across one or more connections between the switch and the first peer switch and one or more connections between the switch and the second peer switch.

19. A method comprising:
receiving details about which link aggregation (LAG) information about a first peer switch will be exchanged with the switch;
sending to the first peer switch, prior to receiving the LAG information about the first peer switch, details about which LAG information about the switch will be exchanged with the first peer switch;
receiving the LAG information about the first peer switch, wherein the LAG information about the first peer switch comprises a maximum number of LAG groups supported by the first peer switch;
storing the LAG information about the first peer switch; and
using the LAG information about the first peer switch and the LAG information about the switch to determine, using a hardware processor, load balancing across one or more connections between the switch and the first peer switch.

20. The method as recited in claim 19, further comprising:
receiving details about which LAG information about a second peer switch will be exchanged with the switch;
sending to the second peer switch, prior to receiving the LAG information about the second peer switch, details about which LAG information about the switch will be exchanged with the second peer switch;
receiving the LAG information about the second peer switch;
storing the LAG information about the second peer switch; and
using the LAG information about the first peer switch, the LAG information about the second peer switch, and the LAG information about the switch to determine, using the hardware processor, load balancing across one or more connections between the switch and the first peer switch and one or more connections between the switch and the second peer switch,
wherein the LAG information about the first peer switch further comprises: a maximum number of LAG members allowed for the first peer switch, an actual number of LAG members used by the first peer switch, and an actual number of LAG groups used by the first peer switch.

* * * * *